(12) United States Patent
Lekutai et al.

(10) Patent No.: US 11,284,399 B2
(45) Date of Patent: Mar. 22, 2022

(54) CONCURRENT CONNECTIVITY WITH BOTH 4G AND 5G NETWORKS FOR MOBILE DEVICES

(71) Applicant: T-Mobile USA, Inc., Bellevue, WA (US)

(72) Inventors: Gaviphat Lekutai, Kirkland, WA (US); Venson Shaw, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 160 days.

(21) Appl. No.: 16/812,241

(22) Filed: Mar. 6, 2020

(65) Prior Publication Data

US 2021/0282126 A1    Sep. 9, 2021

(51) Int. Cl.
| | |
|---|---|
| *H04B 7/216* | (2006.01) |
| *H04W 72/04* | (2009.01) |
| *H04W 72/10* | (2009.01) |
| *H04W 4/029* | (2018.01) |
| *H04W 76/15* | (2018.01) |

(52) U.S. Cl.
CPC ......... *H04W 72/048* (2013.01); *H04W 4/029* (2018.02); *H04W 72/10* (2013.01); *H04W 76/15* (2018.02)

(58) Field of Classification Search
CPC . H04W 88/06; H04W 28/16; H04W 36/0022; H04W 36/14; H04W 48/18; H04W 4/24; H04W 72/0453; H04W 72/048; H04W 88/10; H04W 92/20; H04W 24/08; H04W 28/0257; H04W 28/0268; H04W 40/02; H04W 4/029; H04W 4/16; H04W 4/18; H04W 72/10; H04W 76/11; H04W 76/15; H04W 88/16

USPC ................ 370/329, 252, 330, 235, 216, 389
See application file for complete search history.

(56) References Cited

U.S. PATENT DOCUMENTS

| | | |
|---|---|---|
| 5,477,539 A | 12/1995 | Brown |
| 5,600,707 A | 2/1997 | Miller |
| 5,668,610 A | 9/1997 | Bossard et al. |
| 5,787,344 A | 7/1998 | Scheinert |
| 5,802,173 A | 9/1998 | Hamilton-Piercy et al. |
| 5,875,180 A | 2/1999 | Wiedeman et al. |
| 5,915,219 A | 6/1999 | Poeyhoenen |
| 5,943,330 A | 8/1999 | Hottinen |
| 5,946,633 A | 8/1999 | Mcalinden |
| 5,982,337 A | 11/1999 | Newman et al. |
| 6,023,463 A | 2/2000 | Wiedeman et al. |
| 6,047,177 A | 4/2000 | Wickman |
| 6,094,580 A | 7/2000 | Yu et al. |

(Continued)

OTHER PUBLICATIONS

International Searching Authority, International Search Report and Written Opinion, PCT Patent Application PCT/US2021/020747, dated May 20, 2021, 9 pages.

*Primary Examiner* — Joseph Arevalo
(74) *Attorney, Agent, or Firm* — Perkins Coie LLP

(57) ABSTRACT

In 5G Non-Standalone (NSA), to balance the load on 5G users and 4G users effectively, the disclosed technology selects the proper secondary cell group (SCG), when the master cell group (MCG) is provided by 4G infrastructure. E-UTRAN New Radio-Dual Connectivity (ENDC) allows users to connect to a 4G MCG and a 5G SCG (SCG). The technology selects the SCG based on each user's application's attributes such as UL/DL data volume, speed or bandwidth.

17 Claims, 5 Drawing Sheets

(56) References Cited

U.S. PATENT DOCUMENTS

| | | | |
|---|---|---|---|
| 6,128,500 | A | 10/2000 | Raghavan et al. |
| 6,134,443 | A | 10/2000 | Spann et al. |
| 6,166,727 | A | 12/2000 | Kozuka |
| 6,233,229 | B1 | 5/2001 | Ranta et al. |
| 6,281,846 | B1 | 8/2001 | Puente et al. |
| 6,507,573 | B1 | 1/2003 | Brandt et al. |
| 6,529,734 | B1 | 3/2003 | Lagneborg et al. |
| 6,571,102 | B1 | 5/2003 | Hogberg et al. |
| 6,675,013 | B1 | 1/2004 | Gross et al. |
| 6,684,076 | B2 | 1/2004 | Mckenna et al. |
| 7,577,400 | B2 | 8/2009 | Karabinis et al. |
| 2002/0072816 | A1 | 6/2002 | Shdema et al. |
| 2004/0097260 | A1 | 5/2004 | Stenton et al. |
| 2004/0227661 | A1 | 11/2004 | Godsy |
| 2005/0002323 | A1 | 1/2005 | Hadad |
| 2005/0075125 | A1 | 4/2005 | Bada et al. |
| 2005/0288017 | A1 | 12/2005 | Doumenc et al. |
| 2012/0231827 | A1 | 9/2012 | Oroskar et al. |
| 2016/0044589 | A9 | 2/2016 | Vallath et al. |
| 2019/0182689 | A1* | 6/2019 | Martin .................. H04W 24/04 |
| 2019/0261424 | A1 | 8/2019 | Park et al. |
| 2019/0327707 | A1 | 10/2019 | Agnihotri et al. |
| 2019/0394718 | A1* | 12/2019 | Nimbavikar .......... H04W 28/16 |
| 2020/0015302 | A1 | 1/2020 | Shikari et al. |
| 2021/0007140 | A1* | 1/2021 | Murayama .......... H04W 74/006 |
| 2021/0152998 | A1* | 5/2021 | Parvataneni ............ H04W 4/50 |
| 2021/0266813 | A1* | 8/2021 | Papa ....................... H04W 4/16 |

* cited by examiner

| Factor | Secondary cell group |
|---|---|
| Device type | Corresponding to the device |
| User plan | Maximum bandwidth allowed under the user plan |
| Speed of motion | Speed above a speed threshold indicates 4G |
| Bandwidth requirement | Bandwidth requirement above a bandwidth threshold indicates high-band 5G |
| Bandwidth throughput | Indicates a site with highest bandwidth throughput regardless of 4G or 5G |
| Location<br>dense urban<br>suburban<br>rural | Hi-band 5G<br>low-band 5G<br>4G |
| Device power | Device power below power threshold indicates a low-band site |
| Device thermal indicator | Thermal indicator above a thermal threshold indicates a low-band site |

*FIG. 4*

CONCURRENT CONNECTIVITY WITH BOTH 4G AND 5G NETWORKS FOR MOBILE DEVICES

BACKGROUND 5G is the fifth-generation wireless technology for digital cellular networks, where covered areas are divided into cells with one or more antennas. The frequency spectrum of 5G is divided into millimeter waves, mid-band and low-band. 5G millimeter wave is the fastest, with speeds often being 1-2 Gbit/s on the downlink, and frequencies ranging from 24 GHz to 72 GHz. Millimeter waves have difficulty traversing many walls and windows, so indoor coverage is limited, and their reach is short, thus requiring many more cells, such as small cells or macro cells. 5G mid-band is currently more widely deployed, has speeds in a 100 MHz wide band of 100-400 Mbit/s in the downlink, and frequencies from 2.4 GHz to 4.2 GHz. 5G low-band uses a similar frequency range as 4G, from 600-900 MHz.

BRIEF DESCRIPTION OF THE DRAWINGS

FIG. 4 shows a table of various factors indicating an SCG selection.

DETAILED DESCRIPTION

For 5G Non-Standalone (NSA) deployment in low-band (e.g. 600 MHz), an MCG or anchor cell operates in the 4G mid-band (e.g. 1900 or 1700 MHz), and an SCG operates in the 5G low-band. E-UTRAN New Radio-Dual Connectivity (ENDC) allows users to connect to both a 4G MCG and a 5G SCG. In other words, ENDC allows user equipment to connect to an LTE enodeB that acts as a master node and a 5G gnodeB that acts as a secondary node. The lower the frequency the larger the coverage, and in the above case, the low frequency is the 600 MHz band. If the anchor is mid-band, 1900 or 1700 MHz, the 5G coverage will be restricted to the area where mid-band coverage is available, because when user equipment (UE) moves out of the mid-band coverage, UEs lose the anchor mid-band coverage, which provides important signaling and control messages. Consequently, UEs lose the 5G low-band coverage, which provides data, even though the 5G low-band coverage is still available in the area where UEs are located.

For 5G NSA deployment in high-band (e.g. 28 GHz), the MCG operates in the 4G mid-band (1900 or 1700 MHz), and the SCG operates in the 5G high-band. The higher the frequency the smaller the coverage, high frequency is the 28 GHz band. When UEs move out of the high frequency 5G coverage, the UEs switch to the 4G coverage. In 5G NSA, to balance the load on 5G users and 4G users effectively and efficiently, the disclosed technology selects the proper SCG, when the MCG employs 4G coverage. ENDC allows users to connect to a 4G MCG and a 5G SCG, which can have more cells. The disclosed technology selects the SCG based on each user's application's attributes or factors, such as upload (UL)/download (DL) data volume, speed or bandwidth, to reduce the number of changes to the SCG.

For example, for VR/AR gaming, 4K streaming or applications with less mobility, such as non-vehicle-to-everything, non-(V2X), applications, the ENDC connects to a high-band SCG leg in millimeter (mm) wavelengths. For moderate speed/volume requirements or applications with high mobility, such as V2X applications, the ENDC connects to the low-band SCG leg in 600 MHz. For non-critical, lower speed/volume requirements, such as web browsing, email, Internet of things (IoT), etc., the ENDC stays connected to the mid-band MCG leg in LTE. In addition to data volume/speed, the ENDC can consider one or more of the following: UL/DL requirements of the UE, Doppler speed, number of connected users, power of UEs, thermal indicator of UEs, geographic coverage (e.g., holes or gaps in mm wave coverage due to blocking by buildings), etc.

In addition to determining the master cell site and the secondary cell site for 4G and 5G networks, the technology described in this application can be utilized in selecting master and secondary cell sites in a 6G network that can operate in a terahertz range.

Figure 1:
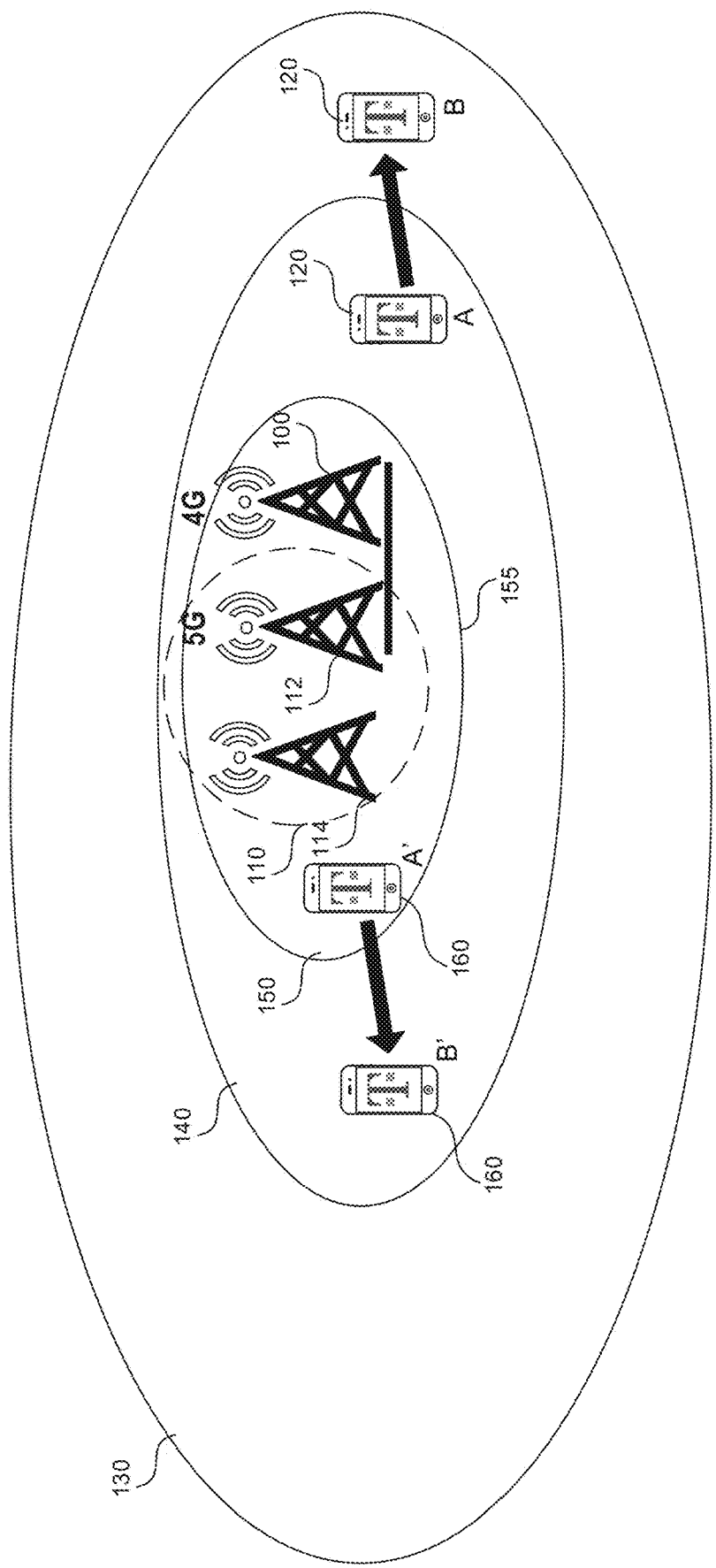
FIG. 1 shows an area covered by a master cell group (MCG) and a secondary cell group (SCG) that together provide cellular network connection in various bands.

FIG. 1 shows an area covered by an MCG and an SCG that together provide cellular network connection in various bands. The MCG 100 can be a 4G site and provide signaling and/or control messages to the SCG 110. The SCG can include multiple sites 112, 114 which can provide data to a UE 120 (e.g., a UE such as a cell phone, cellular vehicle, etc.). The SCG can include a 5G site or a 4G site. The 5G SCG site can operate in low-band, such as 600 MHz-1 GHz; mid-band, such as 1700 MHz-20 GHz, or high-band, such as 20 GHz-300 GHz. The 4G MCG site can operate between 600 MHz-5 GHz.

The lower the frequency provided by a cellular network site, the larger the area covered. Also, the higher the frequency, the higher the bandwidth provided to the UE 120. Area 130 represents the area within which the UE 120 can receive the low-band cellular network signal. Area 140 represents the area within which the UE 120 can receive the mid-band cellular network signal, while area 150 represents the area within which the UE 120 can receive the high-band cellular network signal, also known as mm waves.

If the MCG 100 operates in the mid-band, for example, 1900 or 1700 MHz, the area 140 represents the area covered by the MCG 100. At the same time, the SCG can provide the low-band coverage designated by area 130. When the UE 120 moves from point A to point B, the UE can lose the MCG coverage, and thus lose the 5G low-band coverage, even though the UE is still within the area 130.

Similarly, the MCG 100 can provide service in the mid-band, while the SCG can provide service in 5G high-band. When the UE 160 moves from A' to B', the UE 160 loses the 5G high-band coverage, and the UE 160 can switch over to 5G mid-band coverage provided by SCG 114.

To determine which SCG to provide to the UE 120, 160, a hardware or software processor (executing instructions explained below) can consider several factors, such as mobility of the UE, an anticipated path of the UE, bandwidth requirements of the UE, energy remaining in the UE, location of the UE, UL/DL requirements of the UE, Doppler speed of the UE, number of connected users, device type, cellular network plan, etc.

For example, if the UE 120 is moving towards a boundary of the area coverage 130, 140, 150, such as boundary 155, the processor can select as the secondary subgroup the site 114 that can provide coverage beyond the boundary, such as boundary 155.

Figure 2:
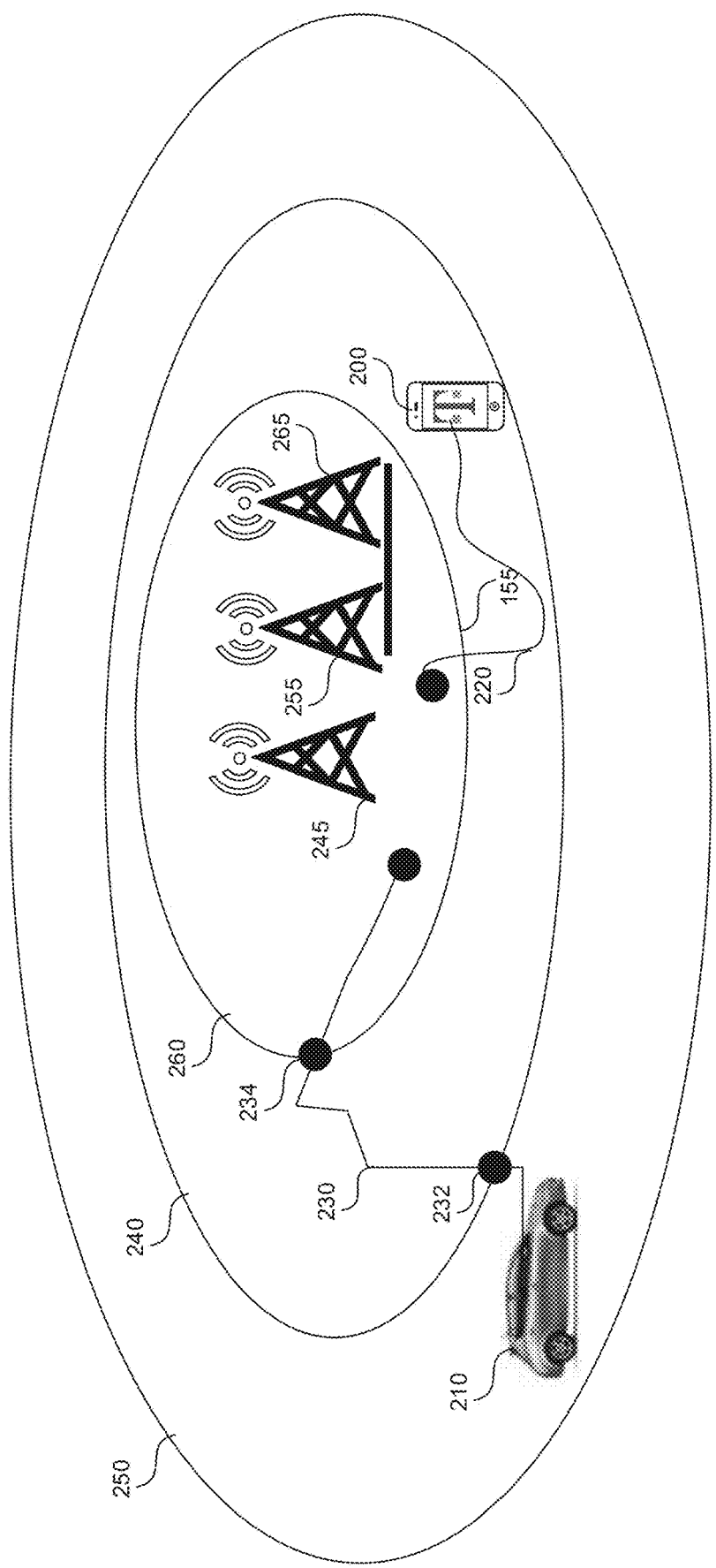
FIG. 2 shows selecting an SCG based on a planned motion of a user equipment (UE).

FIG. 2 shows selecting an SCG based on a planned motion of a UE. The UE 200, 210 can be a mobile device such as a phone, a tablet, a personal digital assistant, a vehicle with a cellular transceiver, a wearable computer, a health monitor, AR/VR display, etc., all of which include one or more processors. The UE 200, 210 can have a navigation software indicating the path that the UE 200, 210 is likely to take, and via APIs for that software, provide route data to the processor.

Even without the navigation software, the path 220, 230 of the UE 200, 210 can be predicted based on a prior history of motion of the UE, when the UE is in the same location. Similarly, the prediction of the path 220, 230 of the UE 200, 210 can be further refined based on the motion of the UE.

For example, when the UE 200, 210 is moving at a speed of a pedestrian, the processor can predict the most likely path based on the prior history of motion of the UE at the same location when the user was a pedestrian. In another example, when the UE 200, 210 is moving at a speed of a vehicle, the processor can predict the most likely path based on the prior history motion of the UE at the same location when the user was moving at the speed of the vehicle.

The predicted path 220, 230 can indicate a motion of the UE 200, 210, through the coverage areas 240, 250, 260. For example, the processor can determine the smallest area containing the path 220 and select the SCG providing the coverage for the area. Specifically, the smallest area containing the path 220 is area 240, and the processor can select the SCG 245, that provides the coverage for the area 240.

In another example, the processor can consider whether the path 230 goes from low-band coverage to high-band coverage, and the processor can upgrade to a site providing a higher band coverage whenever the boundary between the low-band coverage and higher band coverage is crossed. For example, the path 230 crosses from a low-band coverage 250 to a higher band coverage 240, 260 at the points 232 and 234, respectively. While the UE 210 is in the area 250, the processor can select the SCG 255, that provides the coverage for the area 250. When the UE moves along the path 330 beyond the point 232, the processor can select SCG 245, and when the UE 210 moves along the path 230 beyond the point 234, the processor can select secondary group 265.

Figure 3:
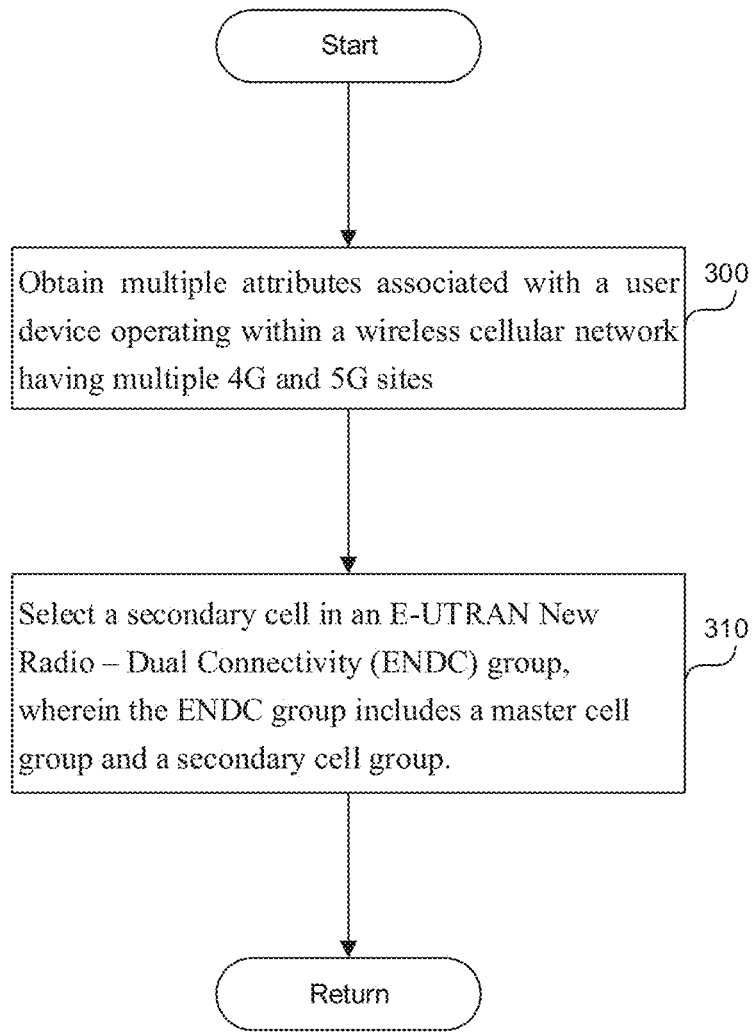
FIG. 3 is a flowchart of a method or processor-implementable instructions to select a secondary cell in an ENDC group.

FIG. 3 is a flowchart of a method or processor-implementable instructions to select a secondary cell in an ENDC group. In step 300, the processor can obtain multiple attributes associated with a UE operating within a wireless cellular network having multiple 4G and 5G sites such as that shown in FIGS. 1 and 2. The multiple attributes or requirements can indicate a cellular network bandwidth, such as a bandwidth requirement associated with the UE, and/or speed of the UE, etc. The bandwidth requirement can specify how bandwidth intensive application running on the UE is.

For example, VR/AR gaming and/or video streaming can have higher bandwidth requirements than web browsing, email, and/or IoT applications. Consequently, the higher bandwidth requirements can necessitate a higher frequency SCG site to ensure a high quality of service (QoS) for the user. Further, some applications can be sensitive to latency, thus the application can require low latency connections.

The processor can obtain various attributes used in selecting the SCG from the application or from network slicing.

For example, for 4G, the processor can obtain the application attributes from an application programming interface (API) dedicated to specific applications such as Netflix, voice call or V2X. In another example, for 5G standalone (SA), the processor can obtain the application bandwidth requirements through a feature called network slicing, where the processor can prioritize the application flows based on specific slicing functions. For example, the slicing function can include ultra-reliable and low latency communications (URLLC), backhaul transport type, radio access network (RAN) resource allocation per service, access restriction, service availability per tracking area (TA) or public land mobile network (PLMN), device location, time of day, service key performance indicators (KPIs), frequency redirection/handover, service security, etc.

Further, the processor can mix and match different slices for a particular ENDC combination of an MCG and an SCG. For example, slice 1 can be low band and serve V2X applications on specific routes, while slice 2 can be mid band and serve Netflix applications with specific security type on specific routes. Network slices can conform to slicing types defined by the 3GPP standard, or the network slices can be defined by additional attributes such as device battery power, location, thermal indicator, particular customer accounts (verticals) such as Ford, BMW, UPS, Uber, geographic topology, etc.

In step 310, the processor can select a secondary cell in an ENDC group, wherein the ENDC group includes an MCG and the SCG. The MCG associated with the ENDC can provide a 4G cellular network connection via a 4G site. The SCG can include at least two sites managed by the 4G site in the ENDC group, where one of the at least two sites can be a 5G site.

To select an SCG, the processor can determine one or more bandwidth throughputs associated with the at least two sites, where the one or more bandwidth throughputs can indicate a cellular network bandwidth provided by the at least two sites. A bandwidth throughput can depend on the frequency band provided by the SCG and a number of users that the SCG has. For example, when the SCG provides a high frequency band, such as millimeter wavelength channels, the bandwidth throughput of the SCG can be high. However, if the SCG providing the high frequency band has a lot of users, the bandwidth throughput of the SCG can be decreased. The processor can select one site in the SCG to provide a cellular network connection to the UE based on determining that the bandwidth requirement is below the bandwidth throughput associated with the selected site.

The processor can consider other attributes, such as power remaining in the UE, latency associated with the application running on the UE, UL/DL requirements of the UE, location of the UE, UE thermal indicator, geographic topology, particular customer accounts such as Ford, BMW, UPS, Uber, etc., as described in this application.

Sometimes, the attributes can contradict each other in terms of indicating the SCG to select. For example, the application running on the UE can be a video streaming application, requiring high-bandwidth, but the device can be moving at high speed, which indicates a preference for low-band connection. To resolve the contradicting demands for the SCG, the processor can obtain at least two priorities associated with the at least two attributes to determine a high priority attribute. For example, the speed of the vehicle can be a higher priority attribute than the bandwidth requirement of the application. The processor can then select one site in the SCG as capable of providing the cellular network bandwidth indicated by the high priority attribute. In this case, the processor can select a secondary cell site providing low-band connection because the speed of the vehicle is a higher priority attribute than the bandwidth requirement of the application.

The processor can consider other attributes, such as a cellular network subscription or a device type associated with the UE. The cellular network subscription can indicate the user's cellular plan. For example, a 4G plan can be cheaper than a 5G plan, or a 5G mid-band plan can be cheaper than a 5G high-band plan. Based on the plan, the processor can select the appropriate SCG. The processor can determine a maximum bandwidth allowed under the cellular network subscription, such as the 5G mid-band plan, and can select one site in the SCG as capable of providing the maximum bandwidth, such as the 5G mid-band plan.

Similarly, the device type can be a 4G device or a 5G device. A 4G device, even if requiring high-bandwidth, may not be able to communicate with a millimeter wave 5G tower. Thus, the device type can dictate the SCG, such as when the device is 4G, the SCG must be 4G.

The processor can consider other attributes, such as speed of motion associated with the UE. The processor can determine whether the speed of motion associated with the UE is above or below a speed threshold. When the speed of motion is above the speed threshold, the processor can select one site in the SCG capable of providing a low-band connection, such as a 4G site. The reason to select a low-bandwidth connection is that when the speed of motion is above the speed threshold, the UE can cover a large area. The low-band connection can provide the greatest area coverage and can consequently reduce handoffs between cell towers and reduction in cellular connection quality.

When the speed of motion is below the speed threshold, the processor can select a site indicated by another attribute, such as bandwidth requirement of an application. For example, when the bandwidth requirement is high, the processor can select a high-band (e.g., millimeter wave) 5G site.

Sometimes at least two attributes among the multiple attributes indicate disparate bandwidth requirements. For example, the bandwidth requirement of the UE can indicate a high-band site, while the location of the vehicle can indicate a mid-band site. The processor can determine a higher bandwidth requirement between the disparate bandwidth requirements, in this case the high-band site. The processor can select one site in the SCG as capable of providing the higher bandwidth requirement cellular network connection. In this case, the processor can select the 5G site providing millimeter wave connection, as the SCG.

An attribute the processor can consider can include a power associated with the UE. The higher the frequency of cellular communication, the more power the UE uses. When the device does not have sufficient power left, utilizing the high-band site can deplete power of the UE, and result in a dropped connection. The processor can determine that the power associated with the UE is below a power threshold, such as 20% of total power. The processor can select one site in the SCG as capable of providing a low-band cellular network connection, thereby preserving the power associated with the UE.

If the processor determines that the power associated with the UE is above a power threshold, the processor can select one site in the SCG indicated by a different attribute. For example, if the UE thermal indicator is high, meaning that the device can be overheating, the processor can select a low-band site, even though the power of the UE is above the power threshold.

The processor can consider a geographic location associated with the UE to determine the SCG. The processor can categorize the location into an urban location, a suburban location, or a rural location, and can select one site in the SCG based on the location. For example, the processor can select the 5G site capable of providing millimeter wave connection when the location is the urban location. The processor can select the 5G site capable of providing low-band connection when the location is the suburban location. The processor can select a 4G site when the location is the rural location.

The UE can have different upload and download bandwidth requirements, depending on a type of application running on the UE. Generally, the UL bandwidth requirement is lower than the DL bandwidth requirement, because more data is being downloaded to the device than uploaded from the device. For example, for a time division duplex (TDD) system, the ratio of DL bandwidth to UL bandwidth can be 3:1 or 4:1. However, in some instances, such as when an AR or a mixed reality (MR) application is running on the UE, the UL bandwidth requirement can match or exceed the DL bandwidth requirement.

Consequently, the processor can dynamically configure UL and DL bandwidth associated with the SCG based on the UL and DL bandwidth requirements associated with the UE. For example, the communication between the UE and the SCG can be configured to allocate more bandwidth to the UL than to the DL, when appropriate.

The processor can also select the SCG based on whether the UL and DL requirements can be dynamically configured, and/or whether the UL and DL allocation provided by the SCG satisfy the UL/DL requirements of the application. The processor can select one site in the SCG as capable of satisfying the UL requirement and the DL requirement of the application.

For example, for a 5G site, the 5G DL and UL ratio can be 4:1, that is, 4 times more bandwidth is allocated to DL than to UL. In that case, the 5G UL speed can be comparable to 4G UL speed. In that case, another factor can be considered, such as the bandwidth throughput of the 5G site versus the 4G site. For example, if the 5G site bandwidth throughput is lower and/or the 5G site has more users, the processor can select a 4G site to handover or perform carrier aggregation. The 4G cell site that is selected as the secondary cell site can be different from the 4G cell site that is the master cell site. If the secondary cell site is 4G, the combination of two or more LTE carriers is called carrier aggregation, coordinated multipoint (CoMP) or multi-transmission point (TRP).

FIG. 4 shows a table of various factors indicating an SCG selection. The factors 410, 420, 430, 440, 450, 460, 470, 480 can sometimes contradict each other. In one embodiment, to determine which SCG to select, the processor can prioritize the two or more contradicting factors, and the factor with the highest priority can determine the bandwidth threshold.

For example, the device type 410 can indicate that the device is a 4G device, but the bandwidth requirement 440 can be above the bandwidth threshold and indicate a high-band 5G site (e.g., millimeter wave). The table 400 can represent the priority of the factors 410-480. The factor 410 representing the device type can be the highest priority factor because the device type indicates whether the device is compatible with 4G or 5G. If the device is compatible with 4G only, the device cannot communicate with that 5G site, and regardless of the bandwidth requirement 440, the device has to connect to a 4G site. Therefore, the processor, based on priority, can select a 4G site, based on the criteria indicated by the device type 410.

In another embodiment, when two factors contradict each other, the processor can determine a higher bandwidth requirement and select one site in the SCG as capable of providing the higher bandwidth requirement cellular network connection. For example, if the factor 460 indicates that the location is suburban, and the bandwidth requirement 440 indicates a high bandwidth, the processor can select a high-band site, despite the location factor 460.

Certain factors, such as device type 410 and user plan 420, can override other factors. For example, if the device type 410 indicates that the device can only connect to a 5G network, any factor 420-480 that indicates a 4G network can be ignored. Conversely, if the device type 410 indicates a device can only connect to a 4G network, any factor 420-480 that indicates a 5G network can be ignored.

In another example, if the user plan specifies the maximum bandwidth is a mid-band, any factor 430-480 that indicates a high-band can be ignored. If the user plan specifies the maximum bandwidth as a high-band, the determination of the secondary cell site can be left to another factor 430-480.

Factors 430-480 can be considered in combination, and a site that has the most factors indicating it, can be selected. For example, the speed of motion 430 can be above the speed threshold, and can indicate a selection of a 4G site, while the bandwidth requirement can indicate a high-band 5G site, while the bandwidth throughput can also indicate the high-band 5G site because the 4G site has lower bandwidth throughput and/or a higher number of users. Overall, the processor can select the high-band 5G site because more factors are indicating the high-band 5G site.

When some factors assume a certain value, the processor can ignore those factors. For example, if the device power 470 is above a power threshold, then the device power is not a factor to be considered. Similarly, if the device thermal indicator 480 is below a thermal threshold, the device thermal indicator does not have to be considered. However, if the device power 470 is below the power threshold, indicating that the device does not have much power left, the processor can consider this factor in determining whether to connect to a high-band, mid-band, or a low-band site, because the higher the frequency band, the higher the power consumption. Similarly, if the device thermal indicator 480 is above the thermal threshold, the device is overheating, and the processor can consider the device thermal indicator 480 is a factor in selecting the SCG because the higher the frequency band, the higher the power consumption, and the higher the overheating of the device. If the device overheats, the device can cease to work.

Computer

Figure 5:
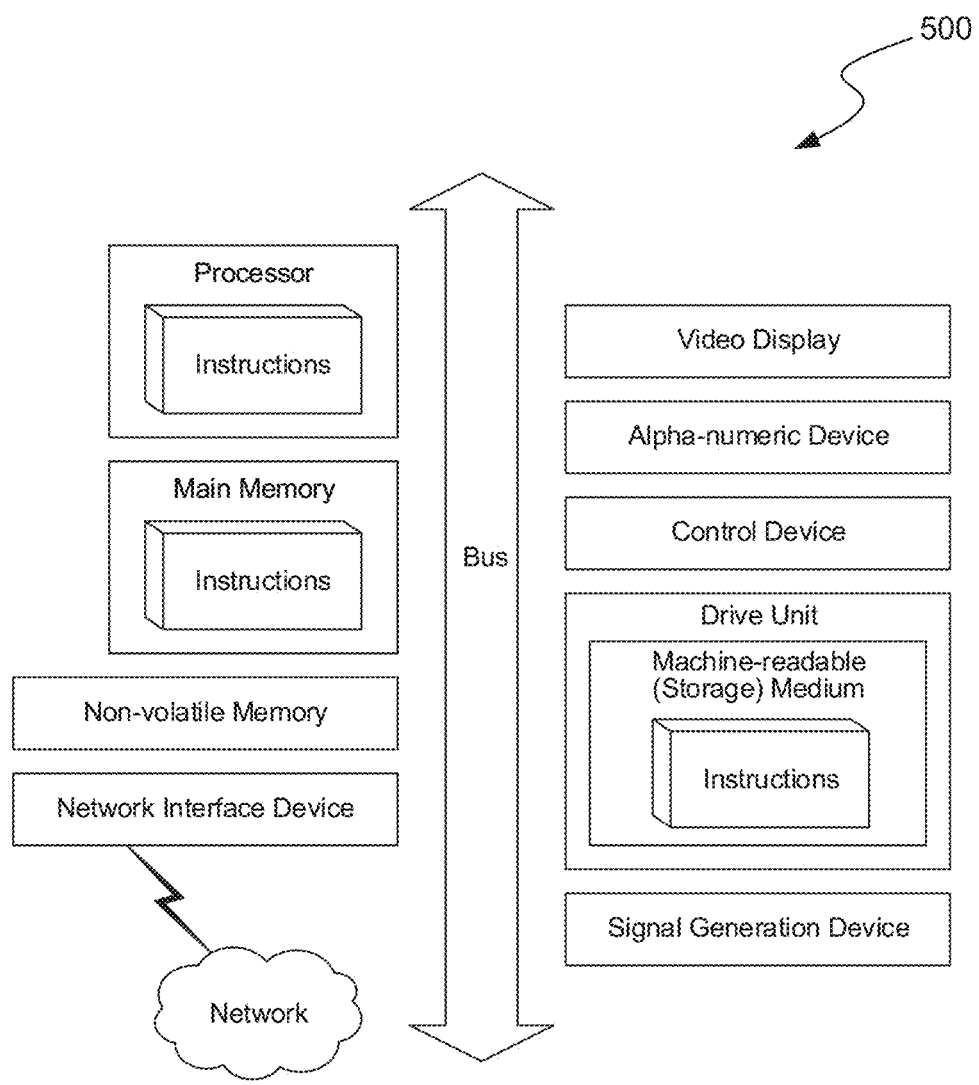
FIG. 5 is a diagrammatic representation of a machine in the example form of a computer system, within which a set of instructions for causing the machine to perform any one or more of the methodologies or modules discussed herein can be executed.

FIG. 5 is a diagrammatic representation of a machine in the example form of a computer system 500 within which a set of instructions, for causing the machine to perform any one or more of the methodologies or modules discussed herein, can be executed.

In the example of FIG. 5, the computer system 500 includes a processor, memory, non-volatile memory, and an interface device. Various common components (e.g., cache memory) are omitted for illustrative simplicity. The computer system 500 is intended to illustrate a hardware device on which any of the components described in the example of FIGS. 1-4 (and any other components described in this specification) can be implemented. The computer system 500 can be of any applicable known or convenient type. The components of the computer system 500 can be coupled together via a bus or through some other known or convenient device.

The computer system 500 can be associated with the UE 120 in FIG. 1, 200, 210 in FIG. 2 and/or the computer system 500 can be associated with an MCG 100 in FIG. 1, an SCG 110 in FIG. 1, a 5G and/or a 4G site 245, 255, 265 in FIG. 2 The processor of the computer system 500 can make the determination of which SCG 110 to select. The main memory, the non-volatile memory, and/or the drive unit can store the instructions to be executed by the processor within the computer system 500. The network of the computer system 500 can be used to communicate between the UE 120, 200, 210, and the 5G and 4G sites 245, 255, 265.

This disclosure contemplates the computer system 500 taking any suitable physical form. As example and not by way of limitation, computer system 500 can be an embedded computer system, a system-on-chip (SOC), a single-board computer system (SBC), such as, for example, a computer-on-module (COM) or system-on-module (SOM), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 can include one or more computer systems 500; be unitary or distributed; span multiple locations; span multiple machines; or reside in a cloud, which can include one or more cloud components in one or more networks. Where appropriate, one or more computer systems 500 can perform without substantial spatial or temporal limitation one or more steps of one or more methods described or illustrated herein. As an example and not by way of limitation, one or more computer systems 500 can perform in real time or in batch mode one or more steps of one or more methods described or illustrated herein. One or more computer systems 500 can perform at different times or at different locations one or more steps of one or more methods described or illustrated herein, where appropriate. The computer system 500 can be in a dedicated location, such as a part of the wireless communication network or can be a part of a networked computing service, also referred to as a "cloud" system. The cloud system can include data centers available to many UEs over the Internet.

The processor can be, for example, a conventional microprocessor, such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory cannot even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 500. The interface can include an analog modem, isdn modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 5 reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general-purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a tablet PC, a laptop computer, a set-top box (STB), a PDA, a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, can be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable-type media, such as volatile and non-volatile memory devices, floppy and other removable disks, hard disk drives, optical disks (e.g., Compact Disk Read-Only Memory (CD ROMS), Digital Versatile Disks, (DVDs)), among others, and transmission type media, such as digital and analog communication links.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state from a binary one to a binary zero or vice-versa in a memory device can comprise a transformation, such as a physical transformation. Rather, the foregoing is intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

The language used in the specification has been principally selected for readability and instructional purposes, and it cannot have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method comprising:
   obtaining multiple attributes associated with a user equipment (UE) operating within a wireless cellular network having multiple 4G and 5G sites,
      wherein the multiple attributes indicate a cellular network bandwidth,
      wherein the multiple attributes include a bandwidth requirement associated with the UE and a speed of motion associated with the UE, and
      wherein at least two attributes among the multiple attributes indicate disparate bandwidth requirements;
   selecting a secondary cell group (SCG) in an E-UTRAN New Radio-Dual Connectivity (ENDC) group,
      wherein the ENDC group includes a master cell group (MCG) and the SCG,
      wherein the MCG associated with the ENDC group provides a 4G cellular network connection via a 4G site,
      wherein the SCG includes at least two 5G sites managed by the 4G site in the ENDC group, and
      wherein the selecting includes:
         determining one or more bandwidth throughputs associated with the at least two 5G sites and indicating a cellular network bandwidth provided by the at least two 5G sites,
         selecting one 5G site in the SCG to provide a 5G cellular network connection to the UE based on determining that the speed of motion is below a speed threshold and the bandwidth requirement is below a bandwidth throughput associated with the selected 5G site,
         obtaining at least two priorities associated with the at least two attributes to determine a high priority attribute, and
         selecting the one 5G site in the SCG as capable of providing the cellular network bandwidth indicated by the high priority attribute.

2. The method of claim 1, wherein selecting the SCG further comprises:
   determining a higher bandwidth requirement between the disparate bandwidth requirements; and
   selecting the one 5G site in the SCG as capable of providing a higher bandwidth cellular network connection.

3. The method of claim 1, wherein the multiple attributes further comprise a power associated with the UE, and wherein selecting the SCG further comprises:
   determining that the power associated with the UE is below a power threshold; and
   selecting the one 5G site in the SCG as capable of providing a low-band cellular network connection, thereby preserving the power associated with the UE.

4. The method of claim 1, wherein the multiple attributes further comprise a location associated with the UE, and wherein selecting the SCG further comprises:
   categorizing the location into an urban location, a suburban location, or a rural location; and
   selecting the one 5G site in the SCG based on the location by
      selecting the 5G site capable of providing millimeter wave connection when the location is the urban location,
      selecting the 5G site capable of providing mid-band connection when the location is the suburban location, and
      selecting the 5G site capable of providing low-band connection when the location is the rural location.

5. A system comprising:
   one or more processors;
   memory coupled to the one or more processors, wherein the memory includes instructions executable by the one or more processors to:
      obtain multiple attributes associated with a UE operating within a wireless cellular network having multiple 4G and 5G sites, wherein the multiple attributes indicate a cellular network bandwidth, and
wherein the multiple attributes include a bandwidth requirement associated with the UE;
select an SCG in an E-UTRAN New Radio-Dual Connectivity (ENDC) group,
wherein the ENDC group includes an MCG and the SCG,
wherein the MCG associated with the ENDC group provides a 4G cellular network connection via a 4G site,
wherein the SCG includes at least two sites managed by the 4G site in the ENDC group, and
wherein selecting a secondary cell includes:
determine one or more bandwidth throughputs associated with the at least two sites and indicating a cellular network bandwidth provided by the at least two sites;
select one site in the SCG to provide a cellular network connection to the UE based on determining that the bandwidth requirement is below a bandwidth throughput associated with the selected site by:
obtaining at least two attributes among the multiple attributes indicating disparate bandwidth requirements and at least two priorities associated with the at least two attributes;
determining a high priority attribute; and
selecting the one site in the SCG as capable of providing the cellular network bandwidth indicated by the high priority attribute.

6. The system of claim 5, wherein the multiple attributes further comprise a cellular network subscription associated with the UE, and wherein the instructions to select the SCG further comprise instructions to:
determine a maximum bandwidth allowed under the cellular network subscription; and
select the one site in the SCG as capable of providing the maximum bandwidth.

7. The system of claim 5, wherein the multiple attributes further comprise a speed of motion associated with the UE and wherein the instructions to select the SCG further comprise instructions to:
determine whether the speed of motion associated with the UE is above a speed threshold; and
upon determining that the speed of motion associated with the UE is above the speed threshold, select the one site in the SCG as capable of providing a low-band connection.

8. The system of claim 5, wherein the instructions to select the SCG further comprise instructions to:
determine a higher bandwidth requirement between the disparate bandwidth requirements; and
select the one site in the SCG as capable of providing a higher bandwidth cellular network connection.

9. The system of claim 5, wherein the multiple attributes further comprise a power associated with the UE, and wherein the instructions to select the SCG further comprise instructions to:
determine that the power associated with the UE is below a power threshold; and
select the one site in the SCG as capable of providing a low-band cellular network connection, thereby preserving the power associated with the UE.

10. The system of claim 5, wherein the multiple attributes further comprise a location associated with the UE, and wherein the instructions to select the SCG further comprise instructions to:
categorize the location into an urban location, a suburban location, or a rural location; and
select the one site in the SCG based on the location by
selecting the 5G site capable of providing millimeter wave connection when the location is the urban location,
selecting the 5G site capable of providing low-band connection when the location is the suburban location, and
selecting a 4G site when the location is the rural location.

11. The system of claim 5, the instructions further comprising the instructions to dynamically configure upload (UL) and download (DL) bandwidth associated with the SCG based on the UL and DL bandwidth requirements associated with the UE.

12. The system of claim 5, wherein the multiple attributes further comprise a UL requirement of an application associated with the UE and a DL requirement of the application associated with the UE, and wherein the instructions to select the SCG further comprise instructions to:
select the one site in the SCG as capable of satisfying the UL requirement and the DL requirement of the application.

13. At least one non-transient computer-readable medium, carrying instructions that, when executed by at least one data processor, performs a method comprising:
obtaining at least one attribute or at least two attributes associated with a UE operating within a wireless cellular network having multiple 4G and 5G sites, wherein the at least one attribute includes—a power remaining in the UE, a latency associated with an application running on the UE, uplink (UL) or downlink (DL) requirements of the UE, a location of the UE, or a UE thermal indicator,
wherein the at least two attributes indicate disparate bandwidth requirements;
selecting an SCG in an E-UTRAN New Radio-Dual Connectivity (ENDC) group,
wherein the ENDC group includes an MCG and the SCG,
wherein the MCG associated with the ENDC group provides a 4G cellular network connection via a 4G site,
wherein the SCG includes at least two 5G sites managed by the 4G site in the ENDC group, and
wherein the selecting includes:
selecting one 5G site in the SCG to provide a 5G cellular network connection to the UE based on an analysis of the at least one attribute by:
obtaining at least two priorities associated with the at least two attributes to determine a high priority attribute; and
selecting the one 5G site in the SCG as capable of providing the cellular network connection indicated by the high priority attribute.

14. The non-transient computer-readable medium of claim 13, wherein selecting the SCG further comprises:
determining a higher bandwidth requirement between the disparate bandwidth requirements; and
selecting the one 5G site in the SCG as capable of providing a higher bandwidth cellular network connection.

15. The non-transient computer-readable medium of claim 13, wherein the at least one attribute comprises the power associated with the UE, and wherein selecting the SCG further comprises:
  determining that the power associated with the UE is below a power threshold; and
  selecting the one 5G site in the SCG as capable of providing a low-band cellular network connection, thereby preserving the power associated with the UE.

16. The non-transient computer-readable medium of claim 13, wherein the at least one attribute further comprises the location associated with the UE, and wherein selecting the SCG further comprises:
  categorizing the location into an urban location, a suburban location, or a rural location; and
  selecting the one 5G site in the SCG based on the location by
    selecting the 5G site capable of providing millimeter wave connection when the location is the urban location,
    selecting the 5G site capable of providing mid-band connection when the location is the suburban location, and
    selecting the 5G site capable of providing low-band connection when the location is the rural location.

17. The non-transient computer-readable medium of claim 13, wherein the at least one attribute further comprises a cellular network subscription associated with the UE, and wherein selecting the SCG further comprises:
  determining a maximum bandwidth allowed under the cellular network subscription; and
  selecting one site in the SCG as capable of providing the maximum bandwidth.

\* \* \* \* \*